UNITED STATES PATENT OFFICE 2,075,958

QUATERNARY AMMONIUM COMPOUNDS AND PROCESS OF PREPARING THE SAME

Henry Alfred Piggott, Blackley, England, assignor to Imperial Chemical Industries Limited, Westminster, England No Drawing. Application May 14, 1934, Serial No. 725,659. In Great Britain May 15, 1933

14 Claims. (Cl. 260—127)

According to the present invention I manufacture quaternary ammonium salts of value in processes for the treatment of textile fabrics by interacting a secondary amine with an alkylating agent and a benzyl halide, either being used first, so as to introduce an alkyl radical and a benzyl radical and then suphonating. As alkylating agents I only include such as introduce an alkyl radical containing at least 6 atoms of carbon.

In a modified form of my invention I use a sulphonated benzyl halide and thus avoid the sulphonation stage.

In carrying the invention into practical effect I may alkylate the secondary amine by treating with an alkyl halide, an alkyl sulphate, or an alkylarylsulphonate, basify the resulting ammonium salt either as formed or after the reaction is complete, and then treat the resulting base with the benzyl halide or sulphonated benzyl halide. Alternatively I may treat the secondary base with the benzyl halide or sulphonated benzyl halide, basify the resulting salt, and then treat with the alkylating agent. In either case, sulphonation is then carried out unless a sulphonated benzyl halide has been used.

The new quaternary salts thus obtained, either before or after sulphonation, possess in their structure the following radical in common, namely

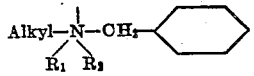

wherein alkyl is an open-chain alkyl radical containing at least 6 carbon atoms, and $R_1$ and $R_2$ are lower alkyl radicals. After sulphonation the new compounds most probably correspond to the formula

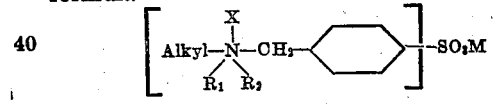

wherein X is an acid forming atom or radical and M is hydrogen or a base forming atom or radical.

The sulphonated derivatives are soluble in water and the solutions have excellent cleansing, wetting, foaming, emulsifying, and dispersing properties. Consequently they are valuable in the textile and allied industries such as the paper and leather industries. They may be used either by themselves or admixed with similar substances. The following examples illustrate but do not limit the invention, the parts being by weight.

Example 1.—A mixture of 59 parts of dimethyl-hexadecylamine (Annalen, vol. 382, pp. 31–32) and 28 parts of benzyl chloride is heated with stirring at 120° C. for 4 hours, by which time the product is completely soluble in water. The benzyldimethylhexadecylammonium chloride thus formed solidifies on cooling, and may be purified by crystallization from acetone.

To a solution of 20 parts of this product in 50 parts of tetrachloroethane, 7 parts of chlorosulphonic acid are added with stirring at such a rate that the temperature does not exceed 30° C. The product is then stirred until hydrochloride acid gas ceases to be evolved, and the tetrachloroethane is removed by distillation in steam. The residue on neutralization with caustic soda, and evaporating forms a gelatinous mass that dissolves readily in water, dilute acids, or dilute alkalis to a readily foaming solution.

Benzyldimethylhexadecylammonium sulphonate is a valuable stripping agent for azo dyestuffs and may be used for this purpose by any convenient procedure, for instance according to the process described in British Patent No. 400,239.

If dimethyloctadecylamine is used in place of dimethylhexadecylamine in the above example a product with very similar properties is formed.

Example 2.—A mixture of 163 parts of benzyldiethylamine and 400 parts of cetyl p-toluene-sulphonate is heated at 100° until a water-soluble product is obtained. This is purified if desired by crystallization from acetone, from which it separates in colourless plates.

The product thus obtained, benzyldiethyl-hexadecylammonium p-toluenesulphonate, when sulphonated under conditions similar to those described in the preceding example yields a product of like appearance and properties.

I claim:

1. The process for the manufacture of quaternary ammonium salts which comprises interacting dimethyl amine in optional order with an alkylating agent containing from 16 to 18 atoms of carbon, and a benzyl halide.

2. The process as claimed in claim 1, in which the benzyl halide carries a sulphonic acid group.

3. The process as claimed in claim 1 in which the product is afterwards sulphonated.

4. The process which comprises interacting dimethylamine in optional order with a cetyl halide and a benzyl halide and then sulphonating.

5. A quaternary ammonium salt in which the nitrogen atom contains, besides the anionic portion of the salt, two methyl radicals, one benzyl radical and one open-chain alkyl radical containing from 16 to 18 carbon atoms.

6. A compound as in claim 5, the compound being sulfonated.

7. A compound as in claim 5, the benzyl radical being substituted by a sulfo group.

8. A quaternary ammonium salt of the general formula

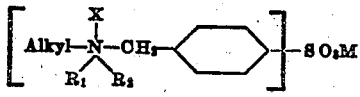

wherein alkyl is an open-chain alkyl radical containing at least 16 carbon atoms, $R_1$ and $R_2$ are lower alkyl radicals, X is an acid-forming atom or radical, and M is hydrogen or a base-forming atom or radical.

9. A quaternary ammonium salt of the general formula

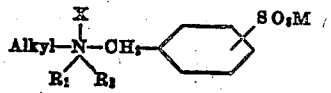

wherein alkyl is an open-chain alkyl radical containing at least 16 carbon atoms, $R_1$ and $R_2$ are lower alkyl radicals, X is an acid-forming atom or radical, and M is hydrogen or a base-forming atom or radical.

10. Benzyl - dimethyl - hexadecyl - ammonium chloride.

11. The sulfonation derivative of benzyl-dimethyl-hexadecyl-ammonium chloride.

12. The process for the manufacture of quaternary ammonium salts, which comprises interacting a secondary dialkyl amine of the lower aliphatic series in optional order with an alkylating agent containing at least sixteen atoms of carbon, and a benzyl halide.

13. A process as in claim 12, in which the benzyl halide carries a sulfonic acid group.

14. A process as in claim 12, in which the product is afterwards sulfonated.

HENRY ALFRED PIGGOTT.